United States Patent [19]
Massieu et al.

[11] Patent Number: 6,149,061
[45] Date of Patent: Nov. 21, 2000

[54] OPTOELECTRONIC DEVICE FOR MULTIDIRECTIONAL CAPTURE OF IMAGES OF PLANE OBJECTS, IN PARTICULAR BAR CODES

[75] Inventors: Jean-Louis Massieu, Montauban; Serge Thuries, Saint Jean, both of France

[73] Assignee: Intermec IP Corp., Beverly Hills, Calif.

[21] Appl. No.: 09/126,315

[22] Filed: Jul. 30, 1998

[30] Foreign Application Priority Data

Jul. 30, 1997 [FR] France .................................. 97 09843

[51] Int. Cl.[7] ................................................ G06K 7/10
[52] U.S. Cl. ................................ 235/462.33; 235/462.36
[58] Field of Search ........................... 235/462.33, 462.36

[56] References Cited

U.S. PATENT DOCUMENTS

| | | | |
|---|---|---|---|
| 5,187,612 | 2/1993 | Plesko | 359/896 |
| 5,202,784 | 4/1993 | Reddersen | 359/196 |
| 5,258,699 | 11/1993 | Grodevant | 318/685 |
| 5,266,787 | 11/1993 | Mazz et al. | 235/467 |
| 5,371,347 | 12/1994 | Plesko | 235/467 |
| 5,464,972 | 11/1995 | Massieu et al. | 235/462 |
| 5,532,468 | 7/1996 | Scofield | 235/472 |
| 5,923,021 | 7/1999 | Dvorkis et al. | 235/455 |

FOREIGN PATENT DOCUMENTS

| | | |
|---|---|---|
| 0 323 026 A3 | 7/1989 | European Pat. Off. . |
| 0 697 674 A1 | 2/1996 | European Pat. Off. . |
| WO 96/13892 | 5/1996 | WIPO . |

*Primary Examiner*—Karl D. Frech
*Attorney, Agent, or Firm*—Perkins Coie LLP

[57] ABSTRACT

An optoelectronic device for multidirectional capture of images, comprising a retro-collector, two independent deflectors and retro-collection means (11), whose deflection means comprise two extending along orthogonal axes and respective deflector drivers coupled to oscillate the deflectors at a specific amplitude between two positions about their axis. The optoelectronic device also includes a controller that controls the drivers so as to oscillate the deflectors at a relatively low frequency between two positions in a first mode, or at a relatively high frequency capable of stabilizing the deflectors between the two positions in a second mode.

13 Claims, 6 Drawing Sheets

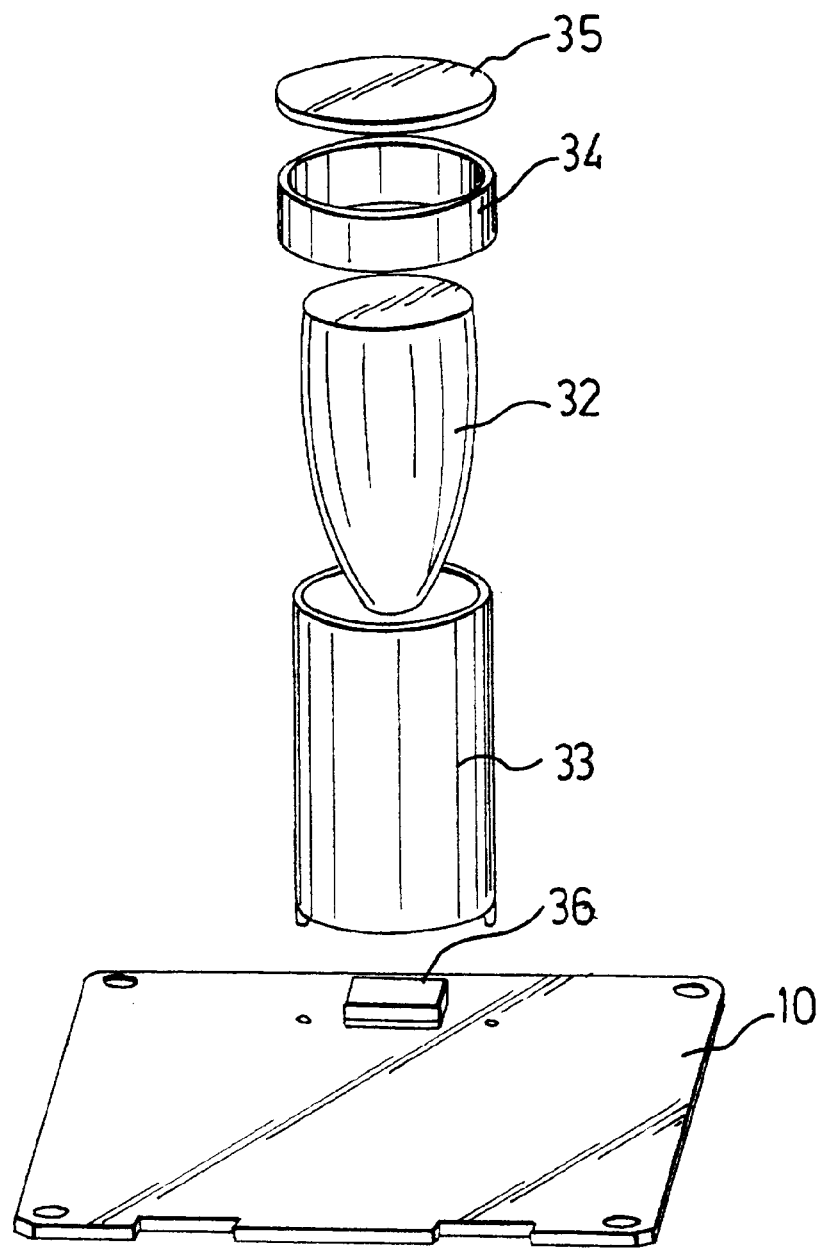

increment 1   increment 2   increment 1

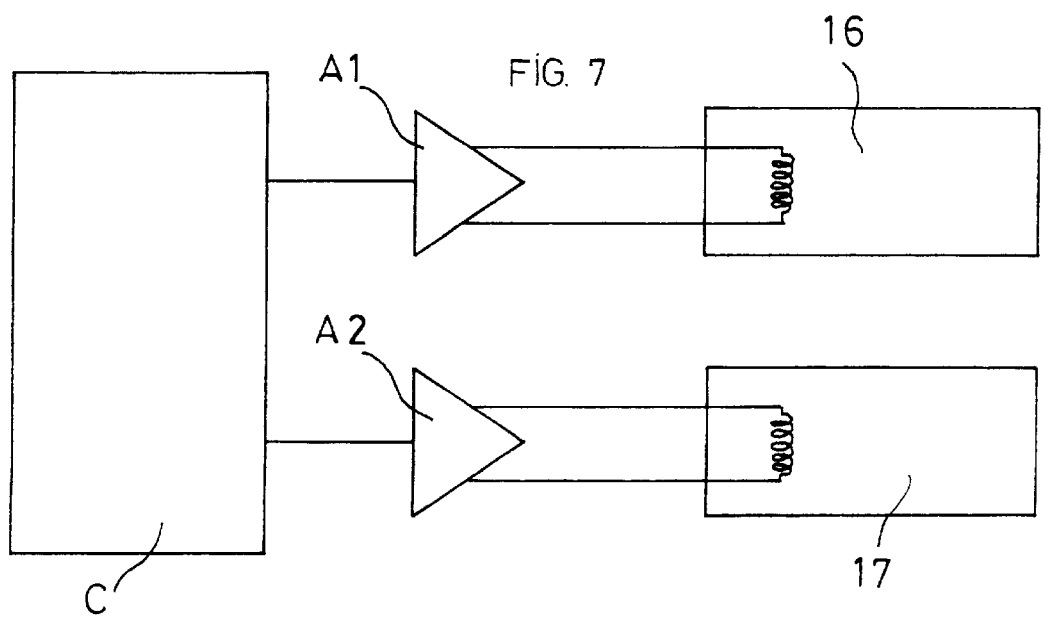
FIG. 7
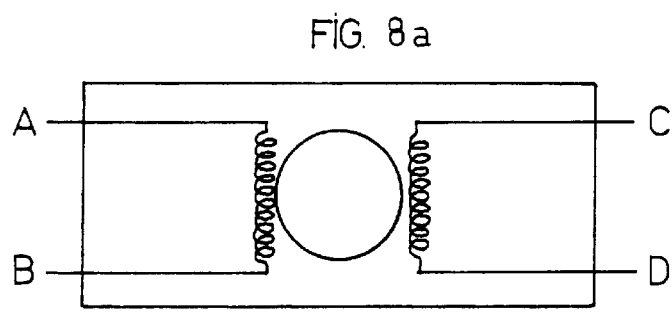
FIG. 8a
FIG. 8b
|   | A | B | C | D |
|---|---|---|---|---|
| 1 | − | + | − | + |
| 2 | − | + | + | − |
| 3 | + | − | + | − |
| 4 | + | − | − | + |

OPTOELECTRONIC DEVICE FOR MULTIDIRECTIONAL CAPTURE OF IMAGES OF PLANE OBJECTS, IN PARTICULAR BAR CODES

TECHNICAL FIELD

The invention concerns an optoelectronic device for multidirectional capture of images of plane objects, such as bar codes.

BACKGROUND OF THE INVENTION

Multidirectional symbol readers such particularly suitable for use in the industrial field, in a fixed position in front of a conveyor on which objects, to which bar codes are affixed, pass by.

For such industrial applications it is in fact necessary to use omnidirectional scanners because the bar codes affixed to the objects can have different orientations, in particular extend either horizontally or vertically. Furthermore, the scanners should permit instantaneous capture of bar codes in order to allow relatively high conveying speeds for the objects. Finally, these scanners should have bar code scanning modes which guarantee systematic capture of each code. In fact, the object to be identified passes by on a conveyor and therefore appears only once in front of the scanner, which excludes any risk of scanning error such as permitted for example at points of sale where the object can be passed again in front of the scanner.

Currently, three main types of multidirectional scanners are used in the industrial field.

The first type of scanner, such as described in particular in the patents U.S. Pat. No. 5,464,972 and EP-697 674, is basically designed to deliver a beam towards a rotating mirror having one or more facets, which deflect said beam towards a number of fixed mirrors partially or completely surrounding the rotating mirror. As explained in these patents, this design enables omnidirectional scanning to be obtained, consisting of a number scanning lines extending with different orientations. The main drawback of this type of scanner lies in the fact that non-optimized, pseudo-random scanning is obtained, which imposes relatively low conveying speeds with a view to ensuring systematic scanning of each bar code.

The second type of scanner, such as described in the patent EP-323 026, basically comprises a first rotating mirror, the normal of which is inclined by several degrees with respect to the axis of rotation, designed to deliver a cone-shaped beam towards a second mirror of identical design, rotated at lower speed than that of the first mirror. This design allows omnidirectional scanning in the shape of a rosette to be obtained, which nevertheless results in the same disadvantages as those of the aforementioned first type of scanner.

Finally, the third type of scanner, such as described in particular in the U.S. Pat. No. 5,371,347 and U.S. Pat. No. 5,187,612, basically consists of a gyratory scanning head carrying a mirror, and arranged so as to oscillate in two perpendicular planes and to rotate about the axis of intersection of said planes. Such scanners enable the drawbacks of the aforementioned scanners to be overcome and offer good scanning reliability at relatively high conveying speeds. However, they require specific basic parts of delicate manufacture bordering on the field of horology, and therefore at a high cost price.

SUMMARY OF THE INVENTION

This invention is intended to overcome certain disadvantages of current multidirectional scanners and its main objective is to supply a multidirectional scanner manufactured from standard basic parts, offering good reliability even at high conveying speeds.

Another objective of the invention is to supply a multidirectional scanner having an unlimited number of scanning modes, and instantaneously reconfigurable.

To this end, the invention aims at a device of the type described in the above preamble, comprising:

a light source capable of supplying an incident light beam, a deflector to deflect the incident light beam and capable of causing said beam to scan the plane objects according to predetermined scanning modes, an electronic sensor for image capture, and a retro-collector capable of allowing images to be formed on the sensor, wherein the deflector comprises:

a first mirror extending longitudinally along an axis (Y), positioned so as to intercept the incident beam delivered by the light source, and mounted on a driver capable of making it oscillate at a specific amplitude between two positions about the axis (Y), a second mirror extending longitudinally along an axis (X) orthogonally to the axis (Y), positioned so as to intercept the beam deflected by the first mirror and to reflect it towards the plane objects, said second mirror being mounted on a driver capable of making it oscillate at a specific amplitude between two positions about the axis (X), a controller for controlling the drivers and capable of allowing the frequency of oscillation of said drivers to be modified, and designed to enable them to be supplied:

either with a frequency intended to cause an oscillation of the associated mirror between its two positions, so as to obtain an oscillatory mode, or with a high frequency capable of more or less stabilizing the associated mirror between its two positions, by controlling, moreover, a continuous variation in the mark-space ratio of the supply, so as to obtain a so-called position mode.

the retro-collector being independent of the first and second mirrors.

The exemplary embodiment of the invention therefore consists, firstly, in creating an optoelectronic device whose deflectors and retro-collector are independent of each other, which enables small mirrors having a low inertia and generating the sole scanning function and instantaneously reconfigurable on account of their low inertia, to be used as deflectors.

Moreover, due to this low inertia of the mirrors, the frequency of oscillation of said mirrors can be very high, and therefore results in very rapid scanning and with a very small scanning response time, which permits high conveying speeds.

Furthermore, according to the frequencies of oscillation and the phase shift between mirrors, scanning patterns and directions can be obtained in unlimited numbers, which can be modified instantaneously, for example by software control, and codes appearing in any orientation can therefore be read.

This optoelectronic device is, however, particularly suited to the scanning of codes oriented either along the X axis or along the Y axis with, as mentioned above, the possibility of instantaneously changing between the scanning positions.

In fact these scanning modes are obtained by generating:

an oscillation of one of said mirrors in its oscillatory mode, which produces a scanning line along one of the axes X or Y, a stabilization of the other mirror in its position mode, which produces an alternating continuous displacement of the scanning line along the other axis X or Y, due to the variation in the mark-space ratio of the supply.

In practice, these cyclical scanning operations prove to be very "aggressive" and permit high conveying speeds.

According to another feature of the invention, the drivers on which the first and second mirrors are mounted comprise stepping motors each connected to mechanical stops capable of allowing the oscillation to be set between two increments of said motor.

Firstly, such stepping motors consist of standard commercial parts, which result in a lower manufacturing cost. Furthermore, the stops force the stepping motors to remain in the attraction zone of the specified increment and ensure against accidental displacement of the orientation of the axis of these motors, possibly as a result of shocks, change of scanning type or the device coming to a standstill.

According to another feature of the invention the retro-collector comprises a non-imaging light collector positioned so as to receive the reflected beams and to collect said beams in the direction of the sensor.

Furthermore, this non-imaging light collector has, for preference, a body of revolution about an axis, and a section which reduces from one entry face of the reflected beams in the direction of the sensor. The shape of this collector is thus advantageously paraboloidal.

According to another feature of the invention, the light source contains a diode laser combined with an optical positioning system.

Other features, objects and advantages of the invention will be revealed in the detailed description which follows, with reference to the attached drawings which show, by way of a non-limiting example, a preferred way of carrying out the invention. In these drawings, which form an integral part of this invention:

BRIEF DESCRIPTION OF THE DRAWINGS

FIG. 4 is an exploded perspective view of the constituent parts of the retro-collector, FIG. 7 is a block diagram of the stepping motor control of the optoelectronic device according to the invention, FIG. 8a is an electrical wiring diagram of a stepping motor, and FIG. 8b table showing the switching sequences of this stepping motor.

DETAILED DESCRIPTION OF THE INVENTION

Figure 1:
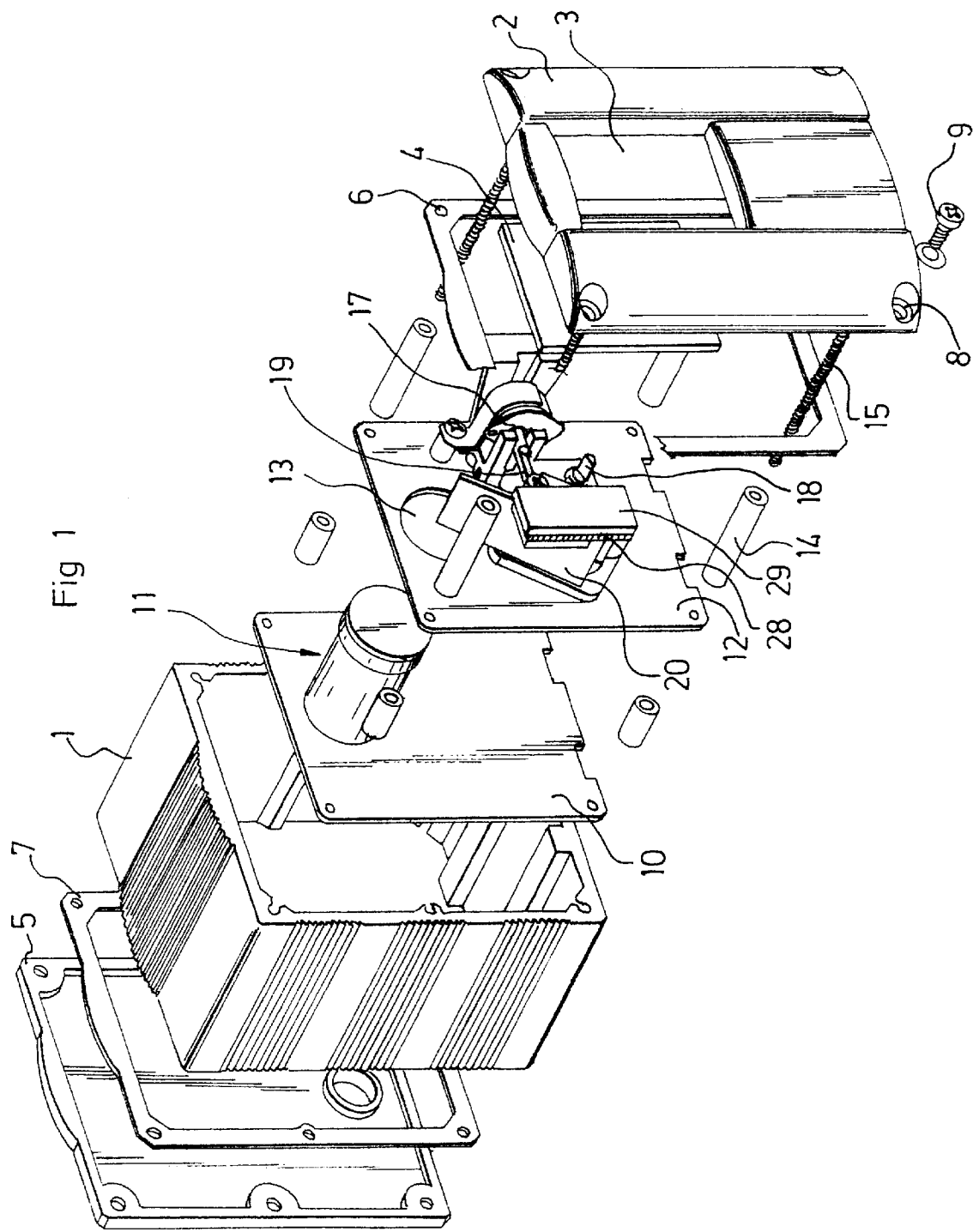
FIG. 1 is an exploded perspective view of the main constituent parts of the optoelectronic device according to the invention.
Figure 2:
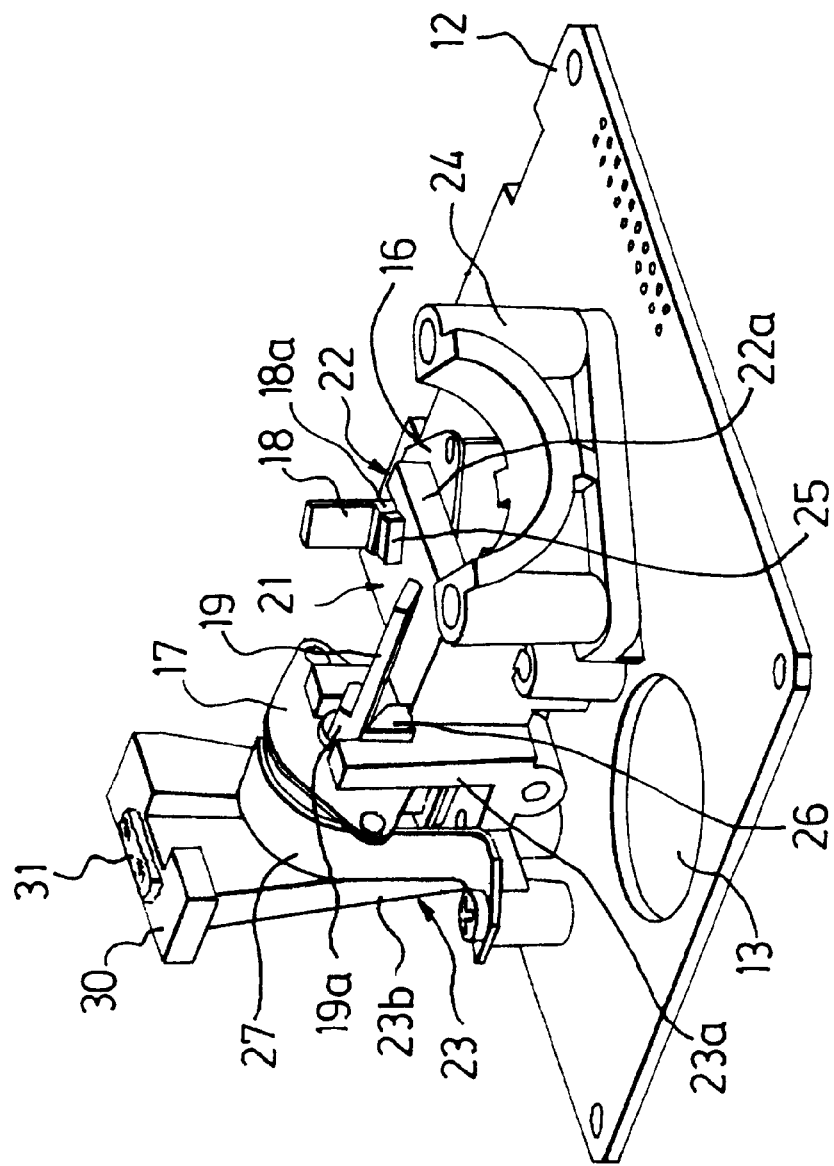
FIG. 2 is a perspective view showing the assembly of the deflectors.

The optoelectronic device according to the invention shown in FIGS. 1 and 2 is intended in particular to be used in industrial applications, in a fixed position in front of a conveyor with the aim of identifying bar codes affixed to objects passing by on the conveyor.

This device firstly comprises a tubular housing 1 of generally parallelepiped rectangular shape closed by a front face plate 2 having a scanning window 3 accommodating a window pane 4, and a rear face plate 5, with seals 6, 7 interposed between said housings and face plates.

Furthermore, the front face plate 2 and the rear face plate 5 have holes, such as 8, drilled straight through at each corner, which allow said face plates to be securely attached to the housing 1 by means of screws 9.

This housing 1 contains two cards:
a main card 10 supporting a retro-collector 11 and a control interface (not shown),
a so-called optical emission card 12 supporting the light source and the deflectors for deflecting the incident beam.

The two cards, 10, 12 are arranged inside the housing 1 so that the optical emission card 12 is interposed between the face plate 2 and the main card 10, said optical emission card having a drilled hole 13 through which extends the retro-collector 11.

Each of these two cards 10, 12 has holes drilled in its corners and their positioning inside the housing 1 is obtained by means of cylindrical spacers, such as 14, fitted around rods, such as 15, with threaded ends, which allow said rods to be securely attached to tapped sleeves arranged on the internal face of the face plate 2, and to the main card 10 by means of nuts, respectively.

Firstly, the deflectors comprise two, 20-increment, stepping motors 16, 17 having two bipolar windings, each supporting a mirror 18, 19, extended for this purpose by a base section 18a, 19a of rectangular cross-section securely attached to the shaft of the associated motor.

As for the light source, it consists of a diode laser combined with an optical positioning system shown in the figures in a general manner by reference number 20.

The stepping motors 16, 17 and the laser diode 20 are mounted on a frame 21 capable of being securely attached to the optical emission card 12, and containing in particular three cradles 22, 23, 24, each capable of accommodating one of these parts.

To this end, the cradles 22, 23 of the stepping motors extend in parallel and orthogonally, respectively, with respect to the optical emission card 12, and each contains two parallel arches, such as 22a, 23a, between which said motors are accommodated, and across which the mirror 18, 19, extends. Furthermore, one of the arches 22a, 23a of each of these cradles 22, 23 has an external face fitted with a respective stop element 25, 26 capable of being extended in relation to the base 18a, 19a of the corresponding mirror 18, 19 so as to limit the oscillation of said mirror and to lock it between two increments of the stepping motor. Lastly, the stepping motors 16, 17 are securely attached in their cradles 22, 23 by means of arms, such as 27.

The diode laser 20 itself is held in its cradle 24 by a bridge 50 (FIG. 3) attached to said cradle, and a Peltier cell 28, itself covered by a strip of thermal foam 29, is mounted on the bar of said bridge 50.

Figure 3:
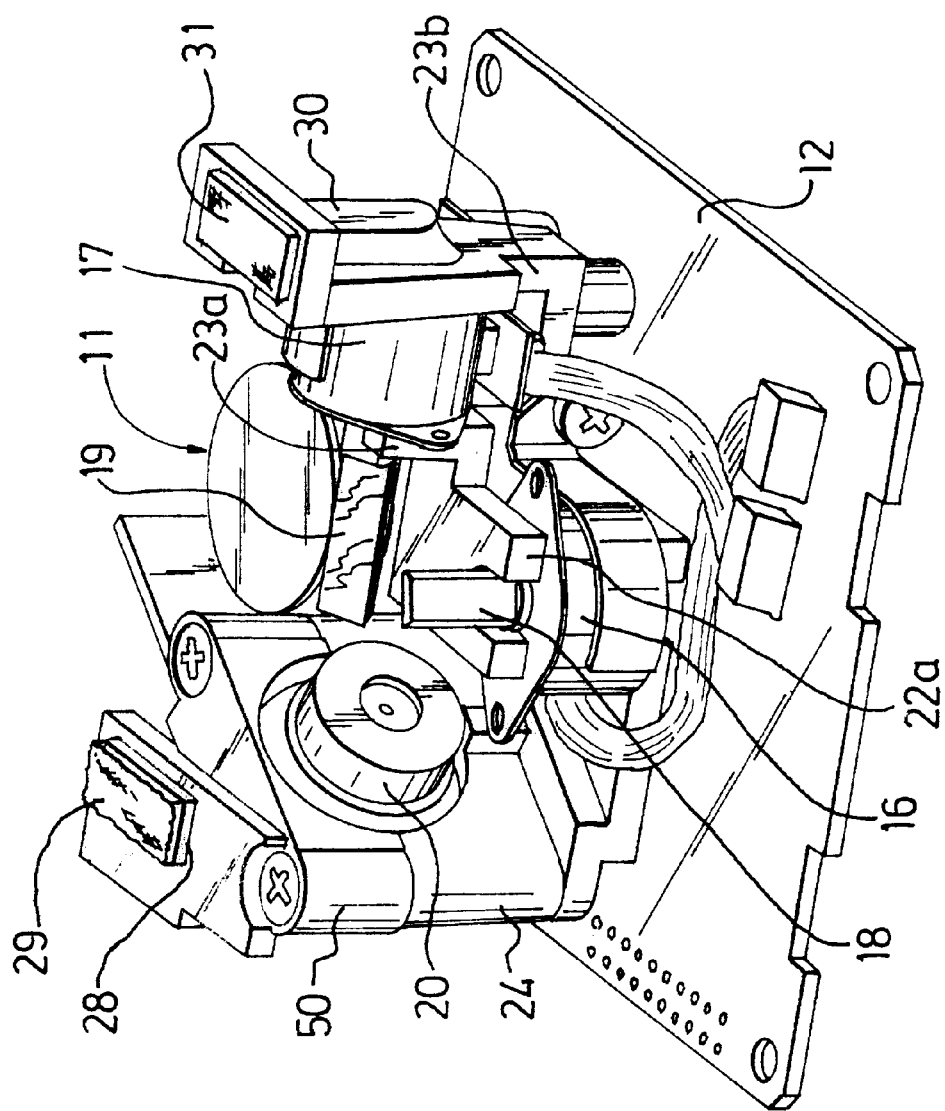
FIG. 3 is a perspective view showing the arrangement of the light source, deflectors and retro collector.

As shown in FIG. 3, the arch 23b of the cradle 23 is, moreover, extended by a blade 30 extending orthogonally with respect to the optical emission card 12; the upper face of which is covered by a strip of thermal foam 31.

The height of this blade 30, as well as that of the bridge 50, is designed so that the foam strips 29, 31 come into contact with the face plate 2 and on the one hand take up play and on the other hand provide a thermal bridge which causes the housing 1 to act as a heat sink.

The retro-collector 11, such as shown in FIG. 4, comprises a non-imaging light collector 32 of a paraboloidal shape, made from either a solid material such as "Plexiglas" (registered trademark), or hollow with internal reflecting faces.

The collector 32 is accommodated inside a tube 33 securely attached to the main card 10 and at the end of which is screwed a ring 34 supporting a polarizing filter 35 designed to eliminate variation in brightness and to avoid saturating the sensor 36 arranged opposite said collector.

Such retro-collector 11, which is independent of the mirrors 18, 19, has the advantage of collecting the light reflected by the laser spot where it is positioned in the scanning zone of the device.

FIGS. 5a, 5b, 6a, 6b show the two modes, oscillatory and position, for controlling the stepping motors 16, 17.

Figure 5A:
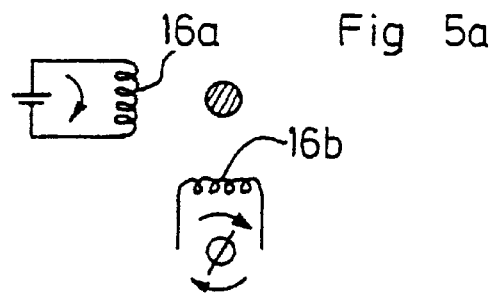
FIGS. 5a, 5b and 6a, 6b are diagrams illustrating the two modes for supplying the stepping motor.

According to the oscillatory mode shown in FIG. 5a, one of the windings 16a is supplied with direct current, while the other winding 16b is supplied intermittently by inverting the polarity of the terminals at a frequency of oscillation of the order of 250 Hz.

Figure 5B:
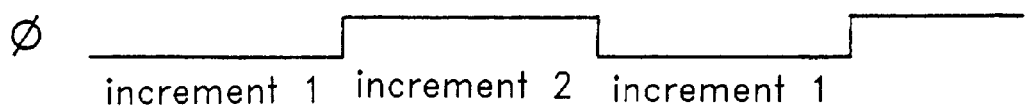

This oscillatory mode enables a primary scanning line to be obtained by oscillating the corresponding mirror 18 or 19 between two increments of the stepping motor 16 or 17, as shown in FIG. 5b.

Figure 6A:
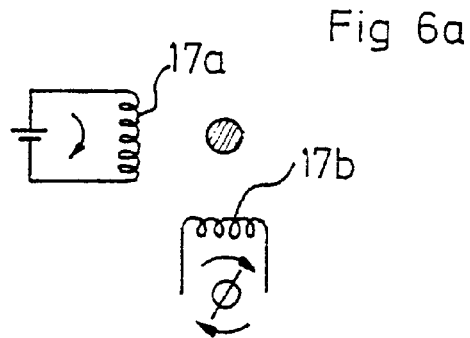
Figure 6B:
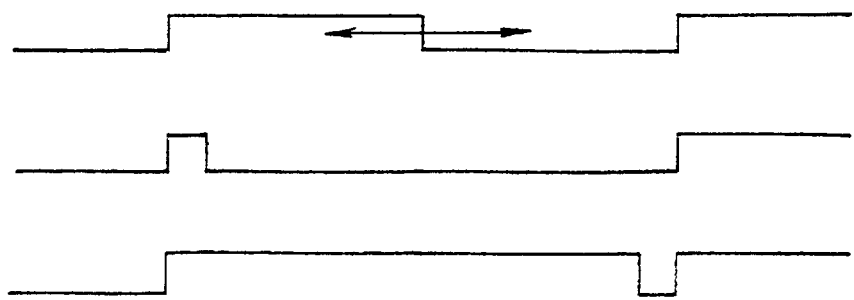

According to the position mode shown in FIG. 6a, one of the windings 17a is supplied with direct current, while the other winding 17b is supplied intermittently by inverting the polarity of the terminals at a frequency above 2.5 KHz, with, furthermore, a continuous variation in the mark-space ratio of the supply, as shown in FIG. 6b.

Firstly, such a supply frequency leads to a reduction in the amplitude of the oscillation so that the mirror is stabilized. Furthermore, the continuous variation in the mark-space ratio of the supply unbalances this mirror and produces a secondary scan by which the scanning line obtained with one mirror 18 or 19 in the oscillatory mode is cyclically displaced by the position mode of the second mirror 19, or 18, along an axis that is perpendicular to said scanning line. Furthermore, it should be pointed out that such a solution has the advantage of enabling dry friction to be countered.

It should be noted that one of the stepping motors 16, 17 can be controlled in the oscillatory mode and the other in the position mode, as described above. Both may also be supplied in the oscillatory mode so as to obtain, depending on phase shifts, a scan in the shape of an oblique line, Lissajous figures, etc.

These different scanning modes are obtained in a conventional manner as shown in FIG. 7 by means of a microcomputer C programmed to deliver control signals for the supply to the two stepping motors 16, 17, after amplification of said signals by the biasing of the amplifier circuits A1, A2.

As for the oscillatory and position scanning modes, these have been obtained for the stepping motor 16 or 17 shown in FIG. 8a by selecting two adjacent states which can be, referring to the table in FIG. 8b, states 2 and 3, which enable:

a direct current supply for poles C and D, a cyclical inversion of the polarity of poles A and B to be obtained.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to readers, not necessarily the exemplary bar code symbology reader generally described above.

These and other changes can be made to the invention in light of the above-detailed description. In general, in the following claims, the terms used should not be construed to limit the invention to the specific embodiments disclosed in the specification and the claims, but should be construed to include all readers that operate in accordance with the claims. Accordingly, the invention is not limited by the disclosure, but instead its scope is to be determined entirely by the following claims.

What is claimed is:

1. An optoelectronic device for multidirectional capture of images of plane objects, in particular bar codes, of the type comprising:

a light source capable of delivering an incident light beam, means for deflecting the incident light beam capable of causing said beam to scan the plane objects according to predetermined scanning modes, an electronic sensor for image capture, and retro-collection means capable of allowing images to be formed on the sensor, wherein said optoelectronic device has deflection means comprising:

a first mirror extending longitudinally along a first axis, positioned so as to intercept the incident beam delivered by the light source, and mounted on driving means capable of making it oscillate at a specific amplitude between two positions about the first axis, a second mirror extending longitudinally along second axis orthogonally to the first axis, positioned so as to intercept the beam deflected by the first mirror and to reflect it towards the plane objects, said second mirror being mounted on driving means capable of making it oscillate at a specific amplitude between two positions about the second axis, means for controlling the driving means capable of allowing the frequency of oscillation of said driving means to be modified, and designed to enable them to be supplied:

either with a frequency intended to cause an oscillation of the associated mirror between its two positions, so as to obtain an oscillatory mode, or with a high frequency capable of substantially stabilizing the associated mirror between its two positions, by controlling, a continuous variation in the mark-space ratio of the supply, so as to obtain a position mode, wherein the retro-collection means are independent from the first and second mirrors.

2. The optoelectronic device as claimed in claim 1, wherein the driving means on which the first and second mirrors are mounted comprise stepping motors, each connected to a respective mechanical stop capable of allowing the oscillation to be set between two increments of said motor.

3. The optoelectronic device of claim 1 wherein the retro-collection means comprise a non-imaging light collector positioned so as to receive the reflected beams and to collect said beams in the direction of the sensor.

4. The optoelectronic device as claimed in claim 3, wherein the non-imaging light collector has a body of revolution about an axis, and a section which reduces from one entry face of the reflected beams in the direction of the sensor.

5. The optoelectronic device as claimed in claim 4, wherein the nonimaging light collector has a paraboloidal shape.

6. The optoelectronic device as claimed in claim 1, wherein the light source contains a diode laser combined with an optical positioning system.

7. An optoelectronic device for the multidirectional capturing of images of plane objects, comprising:
- a light source;
- a first light deflector extending longitudinally along a first axis and positioned to intercept an incident beam from the light source the first light deflector pivotally mounted for oscillating movement about the first axis;
- a second light deflector extending longitudinally along a second axis, differing from the first axis, and positioned to intercept the incident beam reflected from the first light deflector, the second light deflector pivotally mounted for oscillating movement about the second axis;
- a first driver coupled to the first light deflector to drive the first light deflector;
- a second driver coupled to the second light deflector to drive the second light deflector;
- a driver controller controllingly coupled to the first driver and the second driver, wherein the driver controller is configured to operate in a first mode to oscillate the first light deflector at a first frequency and a corresponding first angular displacement, and a second mode to oscillate the first light deflector at a second frequency, greater than the first frequency, and a corresponding second angular displacement substantially equal to zero; and
- a light collector positionable to collect light reflected by the plane objects.

8. An optoelectronic device for the multidirectional capturing of images of plane objects, comprising:
- a light source;
- a first light deflector extending longitudinally along a first axis and positioned to intercept an incident beam from the light source, the first light deflector pivotally mounted for oscillating movement about the first axis;
- a second light deflector extending longitudinally along a second axis, differing from the first axis, and positioned to intercept the incident beam reflected from the first light deflector, the second light deflector pivotally mounted for oscillating movement about the second axis;
- a first driver coupled to the first light deflector to drive the first light deflector;
- a second driver coupled to the second light deflector to drive the second light deflector;
- a driver controller controllingly coupled to the first driver and the second driver, wherein
- in a first mode, the driver controller provides a first control signal to the first driver to oscillate the first light deflector at a first non-resonance frequency to achieve a selected first angular displacement; and
- in a second mode, the driver controller provides a second control signal to the first driver to oscillate the first light deflector at a second frequency sufficiently greater than the first frequency to achieve a selected second angular displacement less than the first angular displacement; and
- a light collector positionable to collect light reflected by the plane objects.

9. An optoelectronic device for the multidirectional capturing of images of plane objects comprising:
- a light source;
- a first light deflector extending longitudinally along a first axis and positioned to intercept an incident beam from the light source, the first light deflector pivotally mounted for oscillating movement about the first axis;
- a second light deflector extending longitudinally along a second axis, differing from the first axis, and positioned to intercept the incident beam reflected from the first light deflector, the second light deflector pivotally mounted for oscillating movement about the second axis;
- a first driver coupled to the first light deflector to drive the first light deflector;
- a second driver coupled to the second light deflector to drive the second light deflector;
- a driver controller controllingly coupled to the first driver and the second driver, wherein
- in a first mode, the driver controller controls the first driver to oscillate the first light deflector at a first non-resonance frequency between a first position and a second position substantially spaced from the first position; and
- in a second mode, the driver controller controls the first driver to oscillate the first light deflector at a second frequency, the second frequency sufficiently high to limit the travel of the first light deflector with respect to the first mode; and
- a light collector positionable to collect light reflected by the plane objects.

10. A method of operating an optoelectronic device for the multidirectional capturing of images of plane objects, comprising:
- producing an incident light beam;
- pivotally oscillating a first deflector about a longitudinal axis thereof to intercept the incident light beam;
- pivotally oscillating a second deflector about a longitudinal axis thereof to intercept the incident beam deflected by the first deflector, the longitudinal axis of the second deflector being different from the longitudinal axis of the first deflector; and
- collecting light reflected by the plane objects with a light collector, wherein pivotally oscillating a first deflector comprises:
  - in a first mode, oscillating the first deflector at a first non-resonance frequency to achieve a first angular displacement thereof between two positions; and
  - in a second mode, oscillating the first deflector at a second frequency, the second frequency sufficiently high to limit the angular displacement of the first deflector with respect to the angular displacement of the first deflector in the first mode.

11. A method of operating an optoelectronic device for the multidirectional capturing of images of plane objects, comprising:
- producing an incident light beam;
- pivotally oscillating a first deflector about a longitudinal axis thereof to intercept the incident light beam;
- pivotally oscillating a second deflector about a longitudinal axis thereof to intercept the incident beam deflected by the first deflector, the longitudinal axis of the second deflector being different from the longitudinal axis of the first deflector; and
- collecting light reflected by the plane objects with a light collector, wherein pivotally oscillating a first deflector comprises:
  - in a first mode, oscillating the first deflector at a first non-resonance frequency and a first angular displacement; and in a second mode, oscillating the first deflector at a second frequency, the second frequency greater than the first non-resonance frequency and the angular displacement less than the angular displacement of the first deflector in the first mode.

12. A method of operating an optoelectronic device for the multidirectional capturing of images of plane objects, comprising:

producing an incident light beam;

pivotally oscillating a first deflector about a longitudinal axis thereof to intercept the incident light beam;

pivotally oscillating a second deflector about a longitudinal axis thereof to intercept the incident beam deflected by the first deflector, the longitudinal axis of the second deflector being different from the longitudinal axis of the first deflector; and collecting light reflected by the plane objects with a light collector, wherein pivotally oscillating a first deflector comprises:

in a first mode, oscillating the first deflector at a first non-resonance frequency between two positions;

in a second mode, oscillating the first deflector at a second frequency, the second frequency sufficiently high to limit the travel of the first deflector with respect to the two positions.

13. The method of claim 12 further comprising:

orienting the longitudinal axis of the second deflector perpendicularly with respect to the longitudinal axis of the first deflector.

* * * * *